United States Patent
Yue et al.

(10) Patent No.: US 9,867,142 B2
(45) Date of Patent: Jan. 9, 2018

(54) TRANSMIT POWER MANAGEMENT DESIGN AND IMPLEMENTATION

(71) Applicant: Avago Technologies General IP (Singapore) Pte. Ltd., Singapore (SG)

(72) Inventors: Guosen Yue, Edison, NJ (US); Fu-Hsuan Chiu, Berkeley Heights, NJ (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 222 days.

(21) Appl. No.: 14/929,223

(22) Filed: Oct. 30, 2015

(65) Prior Publication Data

US 2016/0242122 A1    Aug. 18, 2016

Related U.S. Application Data

(60) Provisional application No. 62/116,049, filed on Feb. 13, 2015, provisional application No. 62/126,235, filed on Feb. 27, 2015, provisional application No. 62/113,926, filed on Feb. 9, 2015.

(51) Int. Cl.
    *H04W 52/24* (2009.01)
    *H04W 52/36* (2009.01)
    *H04W 52/14* (2009.01)

(52) U.S. Cl.
    CPC ....... *H04W 52/244* (2013.01); *H04W 52/367* (2013.01); *H04W 52/143* (2013.01); *H04W 52/242* (2013.01); *H04W 52/245* (2013.01)

(58) Field of Classification Search
    CPC ..... H04W 24/10; H04W 52/04; H04W 52/24; H04W 52/241; H04W 52/242; H04W 52/245; H04W 52/247; H04W 52/248
    See application file for complete search history.

(56) References Cited

U.S. PATENT DOCUMENTS

| | | | | |
|---|---|---|---|---|
| 9,661,585 B2* | 5/2017 | Boudreau | ........... | H04W 52/242 |
| 2003/0171123 A1* | 9/2003 | Laakso | ................ | H04W 28/18 455/453 |
| 2009/0010186 A1* | 1/2009 | Li | ....................... | H04W 52/243 370/310 |
| 2013/0165132 A1* | 6/2013 | Goedken | ............. | H04W 52/243 455/450 |
| 2015/0065140 A1* | 3/2015 | Zhi | ....................... | H04W 36/08 455/436 |
| 2016/0183203 A1* | 6/2016 | Larsson | .............. | H04W 52/241 370/329 |
| 2017/0142741 A1* | 5/2017 | Kaur | ................... | H04W 72/121 |

* cited by examiner

*Primary Examiner* — Robert M Morlan
(74) *Attorney, Agent, or Firm* — Foley & Lardner LLP

(57) ABSTRACT

In some aspects, the disclosure is directed to methods and systems for intelligent transmit power management. Output power levels may be dynamically determined responsive to REM measurements, user equipment (UE) signal reports, information received from other cells (e.g. via X2 application protocol (X2AP) or other such communication protocols), or any combination of these or other information in an iterative level conditioning and limit checking process.

12 Claims, 13 Drawing Sheets

TRANSMIT POWER MANAGEMENT DESIGN AND IMPLEMENTATION

RELATED APPLICATIONS

This application claims priority to and the benefit of U.S. Provisional Application No. 62/116,049, entitled "Transmit Power Management Design and Implementation," filed Feb. 13, 2015; U.S. Provisional Application No. 62/126,235, entitled "Downlink Transmit Power Management for Small Cell Based on Finite State Machine and Iterative Update," filed Feb. 27, 2015; and U.S. Provisional Application No. 62/113,926, entitled "Adaptive Transmit Power Management for a Small Cell," filed Feb. 9, 2015; the entirety of each of which are hereby incorporated by reference for all purposes.

FIELD OF THE DISCLOSURE

This disclosure generally relates to systems and methods for management of transmit power in cellular communications.

BACKGROUND OF THE DISCLOSURE

Small cell base stations, such as picocells or microcells, may be deployed in various locations (e.g. homes, businesses, etc.) without any network operator supervision. Accordingly, system performance in terms of cell coverage, cell throughput, and mobility robustness (e.g. handover quality, etc.) may be highly unpredictable. Power management must be optimized to prevent interference and increase stability and throughput. However, power management for small cells in a cellular network is typically performed via centralized network optimization, and accordingly requires additional network management overhead and lacks flexibility, particularly with complex environments or changing conditions.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
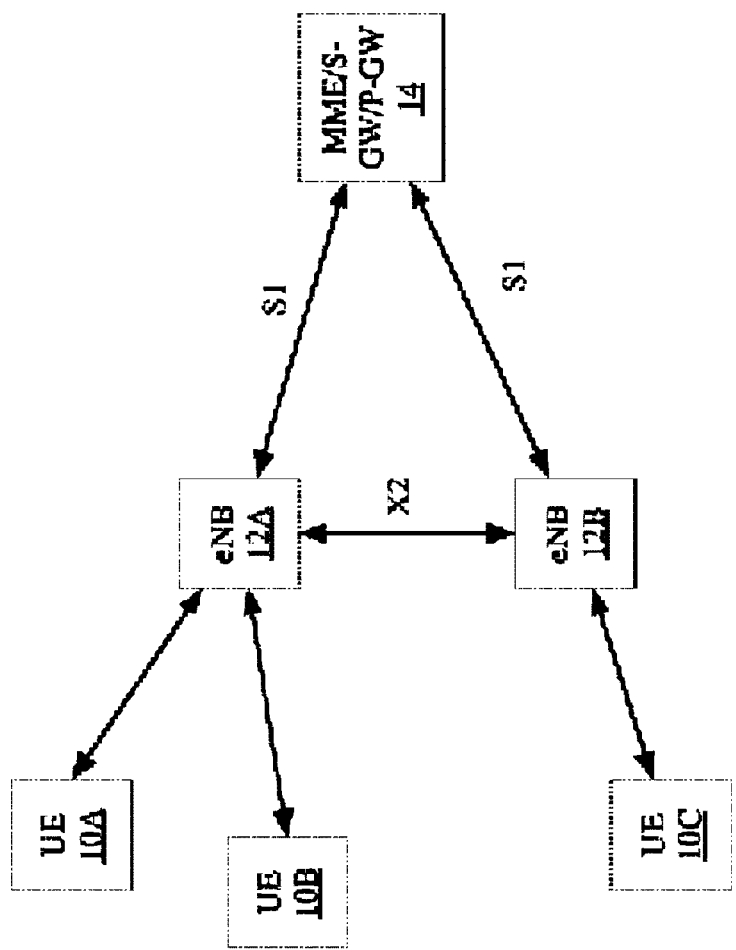
FIGS. 1A-1B are block diagrams depicting a network environment useful in connection with the methods and systems described herein.

The details of various embodiments of the methods and systems are set forth in the accompanying drawings and the description below.

DETAILED DESCRIPTION

The 3GPP and LTE standards are hereby incorporated herein by reference in their entirety and are made part of the present disclosure for all purposes. Although this disclosure may reference aspects of these standard(s), the disclosure is in no way limited by these standard(s).

Before turning to the figures, which illustrate the example embodiments in detail, it should be understood that the application is not limited to the details or methodology set forth in the description or illustrated in the figures. It should also be understood that the terminology is for the purpose of description only and should not be regarded as limiting.

Referring generally to the figures, various systems and methods for managing the transmission power of a small cell in a networked environment is shown and described. Controlling the downlink power of the small cell can be important in order to control the interference created by the device in the networked environment in some embodiments. In some systems, controlling the power output of the small cell in a cellular system includes setting a maximum power level based on a reference signal received power per resource element (RSRP) from macro-cells in the environment. In some embodiments, controlling the power output of the small cell in a Wi-Fi system includes selecting a channel with less interference to avoid the small cell interfering with other cells.

According to various embodiments of the present disclosure, transmit power management of the small cell is generally adjusted based on measurements related to transmissions from other devices and nodes in the networked environment. For example, a metric associated with a power of downlink transmissions from the small cell is determined, and is used to adjust the output power of subsequent downlink transmissions from the small cell (e.g., the metric is compared to a target metric, such as a target power level, and the adjustment adjusts the power to the target power level). The transmission power is generally adjusted such that the small cell does not create interference with other transmissions in the networked environment, or creates a reduced level of interference, and yet is enough to support the transmissions to user equipment or user devices in the networked environment in some embodiments.

In some embodiments, a second metric associated with the power of downlink transmissions received at the small cell may be used to calculate the target metric. For example, the networked environment may include one or more neighboring cells (e.g., small cells, macro-cells, femto-cells, etc.), and each cell may impact the transmissions of other cells. The second metric is used to account for other possible transmissions when determining a power output level for downlink transmissions in the future in some embodiments.

In some embodiments, the small cell determines a metric associated with the power of downlink transmissions received at the small cell from other cells on the same transmission channel used by the small cell. The metric is used to determine an initial output power of downlink transmissions from the small cell, and is adjusted in the future as described above to account for changing conditions in the networked environment in some embodiments. The small cell compares the power of transmissions received at a user equipment in the networked environment and received at the small cell from other cells, and compares the powers to a target power level in some embodiments. The initial output power is then increased or decreased based on the comparison in some embodiments.

In some embodiments, the metric includes a reference signal received power per resource element (RSRP) determined from downlink transmissions received by the small cell from other cells in the networked environment using an adjacent transmission channel to the small cell transmission channel. In some embodiments, the metric includes a code power of a common pilot channel (CPICH) signal received by the small cell on an adjacent transmission channel. In some embodiments, the metric includes a total received downlink power measured by the small cell or an uplink interference power measured by the small cell. A maximum output power may be determined from the various metrics, and the output power may be set to the maximum output power if it exceeds the determined initial output power.

In some embodiments, the output power of a transmission signal from the small cell is adjusted based on a "pain/gain" ratio. The ratio may take into account a possible loss of throughput at the small cell and a possible gain in throughput of one or more neighboring cells from reduced interference that would result from a decrease in output power at the small cell.

According to another aspect of the present disclosure, power management may be managed by receiving, by a first device transmitting on a first channel from a first one or more other devices, a reference signal received power (RSRP) measurement and cell type identifier. The first device may determine a first output power level, based on the received RSRP measurements corresponding to each value of the cell type identifier. The first device may receive, from a second one or more other devices transmitting on channels adjacent to the first channel, a RSRP measurement; and may determine a second output power level, based on a maximum received RSRP measurements of devices transmitting on adjacent channels. The first device may select a maximum transmission output power from a minimum of the first and second determined output power levels.

In some embodiments, the cell type identifier identifies another devices as being a small cell, macro cell on a different channel, or a co-channel macro cell. In one embodiment, determining the first output power level includes identifying a highest RSRP measurement for each cell type identifier from the received measurements. In a further embodiment, determining the first output power level includes retrieving, from one of a plurality of lookup tables corresponding to each of a plurality of values of the cell type identifier, a transmitter power level associated with the identified highest RSRP. In a still further embodiment, the first device may apply a correction factor to the transmitter power level based on a number of received cell type identifiers corresponding to a small cell. In another embodiment, determining the second output power level further includes applying a normalization factor based on a downlink channel bandwidth of one of the first device or the second one or more other devices.

In other embodiments of the present disclosure, a device for iterative transmission power adjustment may include a transmitter with an associated transmission power; a receiver; and a processor configured to maintain a finite state machine comprising a plurality of states, each state associated with a corresponding one of a plurality of predetermined transmission power levels for the transmitter. The processor is further configured to periodically adjust a present state of the finite state machine responsive to a comparison of a current transmission power and a target transmission power.

In some embodiments, the processor is further configured to periodically adjust the present state of the finite state machine to an adjacent state corresponding to a next higher or lower transmission power level from the plurality of predetermined transmission power levels for the transmitter, responsive to the comparison of the current transmission power and the target transmission power. In other embodiments, the device includes a radio environment mapping module configured to identify the target transmission power responsive to a reference signal received power (RSRP) of a second device, measured by the receiver. In still other embodiments, the processor is further configured to periodically adjust the target transmission power based on received signal strengths from one or more other devices. In many embodiments, the device includes a timer, expiration of the timer triggering the periodic adjustments of the present state of the finite state machine.

FIG. 1A is a block diagram depicting a network environment useful in connection with the methods and systems described herein. One or more user equipment UE 10A-10C, such as cellular devices (e.g. telephones, tablets, cellular modems, etc.) may connect to one or more eNodeBs 12A-12B (e.g. picocells, microcells, femtocells, or any other such devices). eNBs 12 may communicate via any protocol, such as the X2 application protocol, for exchanging measurement and configuration parameters as discussed above. eNBs 12 may also communicate with one or more mobile management entities (MMEs), serving gateways (S-GWs), and packet data network gateways (P-GWs) 14, via evolved packet core (EPC) protocols, such as S1 interfaces.

Figure 1B:
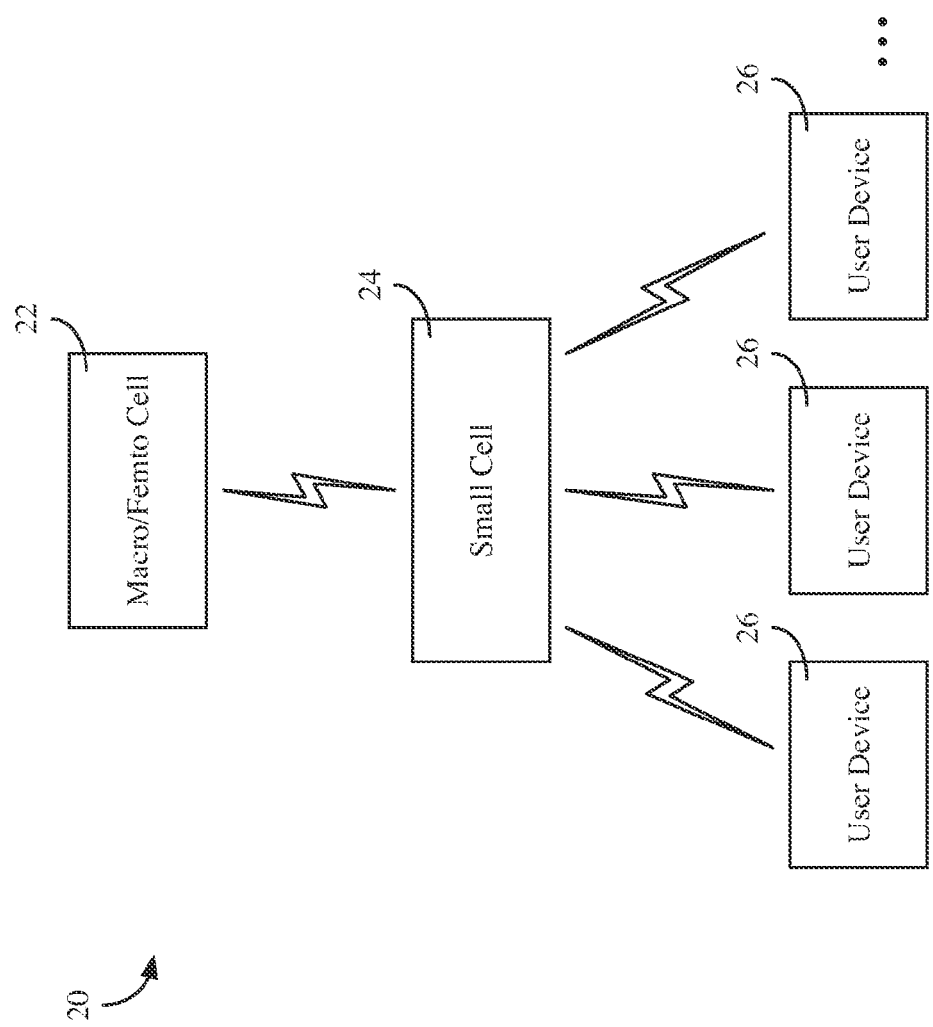

Referring to FIG. 1B, illustrated is another block diagram of an implementation of a networked environment 20 including a macro-cell 22, small cell 24, and a number of user devices 26. Small cell 24 is shown in communication with a number of user devices 26 (e.g., user equipment or user end devices) and macro-cell 22. Small cell 24 is generally a low powered access node with a relatively short range that provides wireless access to a number of user devices 26. Networked environment 20 includes macro-cell 22 which generally provides a larger network coverage to a wider area in some embodiments. While networked environment 20 of FIG. 1B illustrates a single macro-cell 22 and small cell 24, in some embodiments, networked environment 20 includes any number of devices or nodes for facilitating communication between a plurality of user devices and the devices or nodes. For example, in some embodiments, networked environment 20 includes a plurality of small cells to which user devices 26 may connect. In some embodiments, networked environment includes a femto-cell instead of, or in addition to, macro-cell 22.

In the present disclosure, the terms "user equipment," "user device," "UE" and the like can be used interchangeably to describe a user device (e.g., a mobile device) receiving and transmitting signals in the networked environment. Similarly, "macro-cell" is generally used to describe a node in the networked environment that provides a larger network coverage than a small cell; in other embodiments, other types of nodes that provide such coverage may be implemented. Further, "small cell" and "base station" or "BS" refers to the same node in a networked environment for which a power output is calculated and adjusted.

Figure 1C:
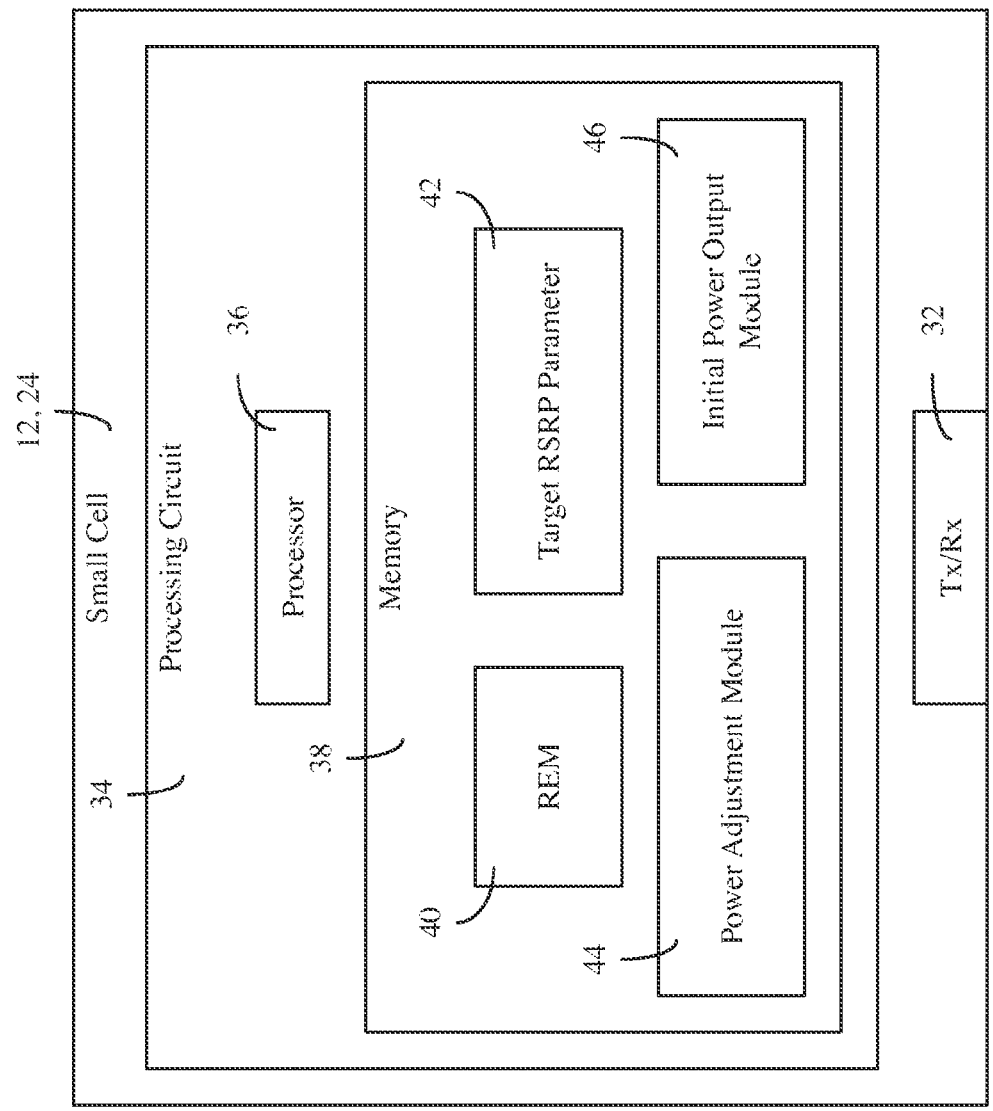
FIG. 1C is a detailed block diagram of a small cell of the networked environment according to an embodiment.

Referring also to FIG. 1C, an example embodiment of small cell 12, 24 is shown in greater detail. Small cell 12, 24 is implementable in an environment such as an office, commercial or residential building, school, or any other type of environment in which devices connect wirelessly. Small cell 12, 24 communicates with the various devices over a network that incorporates one or more of a variety of communication methods or protocols. Small cell 12, 24 serves as an access point for the various devices, and can be any type of access point for facilitating any type of wireless communication method or protocol.

Small cell 12, 24 is shown to include a transmitter/receiver circuit 202 for transmitting and receiving data to and from a plurality of user devices and other cells in the networked environment. Small cell 12, 24 can include various interfaces, buffers, and other typical components for facilitating the wireless communications between small cell 12, 24, other cells, and user devices. For example, small cell 12, 24 includes a channel selector, scheduler, and other components that assist small cell 12, 24 in receiving and transmitting signals to and from other cells and user equipment in some embodiments. The configuration of small cell 12, 24 can vary without departing from the scope of the present disclosure.

Small cell 12, 24 is further shown to include a processing circuit 34 including a processor 36 and memory 38. Processor 36 is, or includes, one or more microprocessors, application specific integrated circuits (ASICs), circuits containing one or more processing components, a group of distributed processing components, circuitry for supporting a microprocessor, or other hardware configured for processing. Processor 36 is configured to execute computer code stored in memory to complete and facilitate the activities described herein. Memory 38 is any volatile or non-volatile computer-readable storage medium capable of storing data or computer code relating to the activities described herein. For example, memory 38 is shown to include modules that are computer code modules (e.g., executable code, object code, source code, script code, machine code, etc.) configured for execution by processor 36. According to some embodiments, processing circuit 34 may represent a collection of processing devices (e.g., servers, data centers, etc.). In such cases, processor 36 represents the collective processors of the devices and memory 38 represents the collective storage devices of the devices.

Various modules are illustrated in memory 38 of small cell 12, 24 for managing the power output of small cell 12, 24. A radio environment mapping (REM) module 40 of memory 38 is shown that generates, stores, and/or provides information for small cell 12, 24 relating to the networked environment (e.g. a radio environment map or REM). For example, REM module 40 generates information relating to signals received at and transmitted from small cell 12, 24. In some embodiments, the information includes a RSRP determined from a downlink transmission received at small cell 12, 24 from another cell using a same transmission channel as the transmission channel used by small cell 12, 24. In some embodiments, the information includes a RSRP determined from a downlink transmission received at small cell 12, 24 from another cell using an adjacent transmission channel to the transmission channel used by small cell 12, 24. In some embodiments, the information includes a code power of a CPICH signal received by small cell 12, 24 from an adjacent transmission channel. In some embodiments, the information includes a total received downlink power measured by small cell 12, 24, or an uplink interference power measured by small cell 12, 24. The information in REM module 40 is used to calculate an initial power output of small cell 12, 24 and to adjust the power output of small cell 12, 24 as described below.

Small cell 12, 24 and memory 38 are further shown to include a target RSRP parameter 42 in some embodiments. In some embodiments, target RSRP parameter 42 is a configurable parameter that can be set by a service provider or technician. In some embodiments, target RSRP parameter 42 is set to a percentage of the RSRP of one or more neighboring cells, for example, 95% of the RSRP of the strongest co-channel neighboring cell (e.g., 95% of the RSRP of the nearest cell sharing a channel with small cell 12, 24). Target RSRP parameter 42 is adjustable based on other factors (e.g., wall penetration loss and other possible signal loss); and the margin can be configurable (e.g., more or less than 95%).

Small cell 12, 24 and memory 38 further includes a power adjustment module 44 that adjusts an output power of small cell 12, 24 for a subsequent downlink transmission from small cell 12, 24. Power adjustment module 44 determines a metric associated with a power of downlink transmissions from small cell 12, 24. For example, the metric represents a power output associated with a previous transmission of small cell 12, 24. The metric is compared to a target metric in some embodiments. The target metric is, for example, related to a target RSRP parameter, or other parameter that indicates an appropriate power output level for small cell 12, 24 based on the configuration of the devices and nodes in the networked environment. The output power is then adjusted based on the comparison in some embodiments.

In some implementations, the target metric is calculated using a metric associated with the power of downlink transmissions from neighboring cells. For example, a neighboring cell transmits a signal to small cell 12, 24, and the power of the signal is used to calculate the metric. This allows power adjustment module 44 to adjust the power of its signal in relation to the power of signals transmitted from nearby cells. In various embodiments, the downlink transmissions occur on a transmission channel adjacent to the transmission channel of small cell 12, 24, or may share the same transmission channel as small cell 12, 24.

In some implementations, the target metric is a target RSRP. Metrics relating to a RSRP received from a user equipment receiving downlink transmissions from small cell 12, 24 and a RSRP determined by small cell 12, 24 from a received downlink transmission from another cell are retrieved. The RSRP values are then used to determine the output power adjustment. For example, if the RSRP related to downlink transmissions from small cell 12, 24 is lower than the target RSRP, the output power is increased. If the RSRP related to downlink transmissions from small cell 12, 24 is higher than the target RSRP, the output power is increased. Therefore, the output power of future transmissions from small cell 12, 24 is adjusted based on the power output from previous transmissions in the networked environment in some embodiments.

In some embodiments, the power adjustment can be based on one or more metrics retrieved from REM module 40. For example, one or more of the RSRP from downlink transmissions received at small cell 12, 24, the code power of a CPICH signal received at small cell 12, 24, the total received downlink power, or the uplink interference power are used to adjust the power output of small cell 12, 24. These metrics generally indicate a power level associated with various transmissions in the networked environment, and the power output of small cell 12, 24 is adjusted so as to not interfere or be interfered with by the other cells. The maximum output power from the metrics are determined, and if the initial or current output power of small cell 12, 24 exceeds the maximum output power, the output power is adjusted downward to equal the maximum output power.

Small cell 12, 24 and memory 38 further includes an initial power output module 46 that calculates an initial power output of small cell 12, 24. The initial power output of small cell 12, 24 is calculated based on various metrics retrieved from REM module 40. In some embodiments, the calculation further includes using a path loss model associated with small cell 12, 24 to estimate a signal loss and to account for the signal loss in determining the power output. In some embodiments, the calculation further includes determining a target interference level that incorporates possible signal interference into the power output calculation.

Figure 1D:
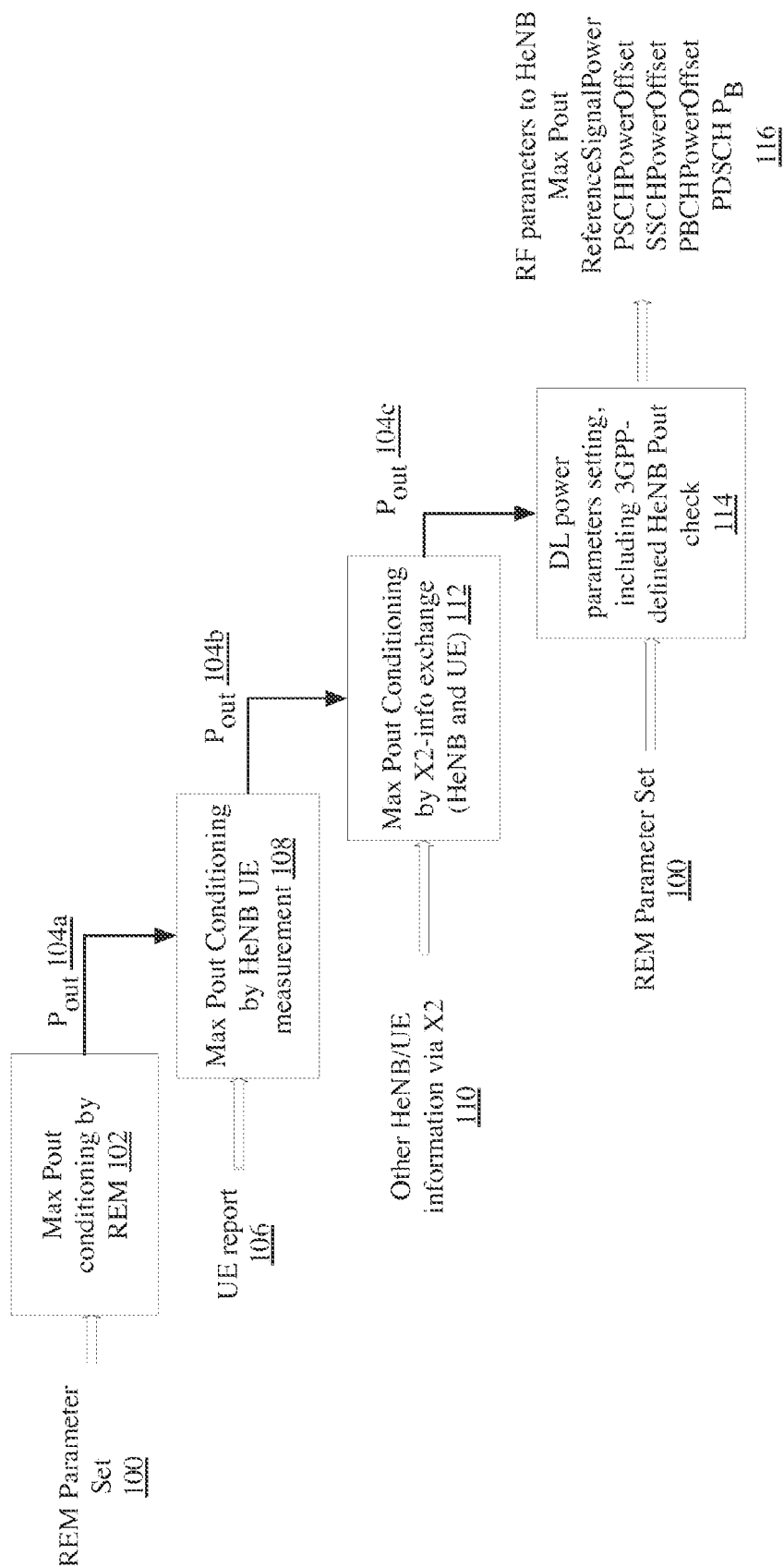
FIG. 1D is a flow diagram depicting an implementation of a method for transmit power management.

Power management for small cells may be performed intelligently by each base station responsive to REM measurements, user equipment (LIE) signal reports, information received from other cells (e.g. via X2 application protocol (X2AP) or other such communication protocols), or any combination of these or other information. One such implementation, illustrated in FIG. 1D, provides multiple layers of output power ($P_{out}$) conditioning based on these various parameters and measurements. A REM parameter set 100 may be measured and used as an input to a method for determining a maximum $P_{out}$ at step 102. The REM parameter set 100 may include one or more of the following parameters:

| Name | Type | Scope | Description |
| --- | --- | --- | --- |
| For each LTE co-channel (and 2nd layer macro cells, even if on different channels) [0 . . . 15] | | | |
| Reference Signal Received Power (RSRP) | UINT8 | 0 . . . 128 | Represents average RF power in all of the reference signals in the passband, from −144 to −16 dBm in 1 dB steps |
| DLBandwidth | ENum | n6, n15, n25, n50, n75, n100 | Downlink channel bandwidth in numbers of resource blocks (RB) |
| RSTxPower | UINT8 | 0 . . . 110 | Represents reference signal transmission power from −60 to −50 dBm in 1 dB steps |
| Cell Type | ENum | Macro, Macro_CC, small | Represents type of cell, including non-co-channel macro cell, co-channel macro cell, and small cell |
| For each LTE adjacent channel (both upper and lower) to be protected [0 . . . 31] | | | |
| RSRP | UINT8 | 0 . . . 128 | Represents average RF power in all of the reference signals in the passband, from −144 to −16 dBm in 1 dB steps |
| For each 3G adjacent channel (both upper and lower) to be protected [0 . . . 31] | | | |
| Common pilot channel (CPICH) received signal code power (RSCP) | UINT8 | 0 . . . 145 | Represents RSCP strength from −120 to −25 dBm in 1 dB steps |
| Downlink and Uplink received signal strength indicators (RSSI) | | | |
| Ioh (downlink) | UINT8 | 0 . . . 91 | Represents total received power density, excluding home base station signal, present at the home base station antenna connector on the home base station operating channel, from −110 to −19 dBM in 1 dB steps |
| Iob (uplink) | UINT16 | 0 . . . 511 | Represents uplink received interference power, including thermal noise, within one physical resource block's bandwidth of resource elements, present at the home base station antenna connector on the home base station operating channel, from −126 to −75 dBM in 0.1 dB steps |

The output $P_{out}$ 104A may be provided as an input, along with signal report parameters from UE 106 connected to the Home eNode base station (HeNB) in a second power conditioning step 108. UE parameters 106 may include:

| Name | Type | Scope | Description |
| --- | --- | --- | --- |
| DLBandwidth | ENum | n6, n15, n25, n50, n75, n100 | Downlink channel bandwidth in numbers of resource blocks (RB) |
| Number of Cell-specific Antenna Ports | UINT8 or ENUM | 1, 2, 4 | Number of transmitter antenna ports transmitting cell-specific reference signals |
| Powersetting Offset | Enum | 30 . . . 70, in steps of 5 | The value of the variable X used in evolved universal terrestrial radio access (E-UTRA) co-channel protection (e.g. 30 dB ≤ X ≤ 70 dB) |

-continued

| Name | Type | Scope | Description |
|---|---|---|---|
| CSG Indication | Bool | True, False | Indicates whether the HeNB is configured for use only by a closed subscriber group (CSG) |
| Pollution Mitigation Level | Enum | Low, Medium, High | Represents the level of mitigation the module applies to control pilot pollution, in accordance with small cell forum (SCF) parameter definitions |
| Reference Signal Power | UINT8 | 0 . . . 110 | Represents reference signal power level from −60 to −50 dBm, in 1 dB steps |
| PSCH Power Offset | UINT16 | 0 . . . 500 | Represents primary synchronization (PSCH) signal power offset, from −35.0 to 15.0 dB in 0.1 dB steps |
| SSCH Power Offset | UINT16 | 0 . . . 500 | Represents secondary synchronization (SSCH) signal power offset, from −35.0 to 15.0 dB in 0.1 dB steps |
| PBCH Power Offset | UINT16 | 0 . . . 500 | Represents physical broadcast channel (PSCH) power offset, from −35.0 to 15.0 dB in 0.1 dB steps |
| PDSCH $P_B$ | UINT8 | 0 . . . 3 | Represents the physical downlink shared channel (PDSCH) parameter $P_B$, used to calculate the reference signal power and PDSCH power. |

The output $P_{out}$ 104B may be provided as an input, along with parameters 110 from other HeNB and UE received via X2 or a similar communication protocol, in a third power conditioning step 112. Parameters 110 may include:

| Name | Type | Scope | Description |
|---|---|---|---|
| Power control algorithms selection | | | |
| Non CSG $P_{out}$ check | Boolean | True, False | Set by operator, and affects maximum downlink power setting. $P_{out}$ may be further conditioned if the HeNB is configured as a CSG |
| RSRP threshold | | | |
| Neighbor Cell RSRP threshold | UINT8 | 0 . . . 128 | Represents RSRP threshold from −144 to −16 dBm, in 1 dB steps, and may be locally or remotely configured |
| HeNB power limits | | | |
| $P_{ini}$ | INT8 | −50 . . . 24 | Initial power level when the transmitter is first powered on or rebooted, from −50 to 24 dBm in 1 dB steps, and may be local or remotely configurable |
| $P_{min}$ | INT8 | −50 . . . 24 | Absolute lowest power level allowed when the transmitter is powered on, from −50 to 24 dBm in 1 dB steps, and may be local or remotely configurable |
| $P_{max}$ | INT8 | −50 . . . 24 | Absolute maximum power level allowed when the transmitter is powered on, from −50 to 24 dBm in 1 dB steps, and may be local or remotely configurable |

The output $P_{out}$ 104C may be provided as an input, along with REM parameter set 100 for verification of downlink power parameters, including HeNB $P_{out}$ checks defined in the 3GPP standards, in a fourth power conditioning step 114. The output RF parameters include:

| Name | Type | Scope | Description |
|---|---|---|---|
| Max $P_{out}$ | UINT8 | −50 . . . 24 | Represents dynamically determined maximum power level to use, from −50 to 24 dBm in 1 dB steps |
| Reference Signal Power | UINT8 | 0 . . . 110 | Represents dynamically determined reference signal power to use, from −60 to 50 in dBm in 1 dB steps |
| PSCH Power Offset | UINT16 | 0 . . . 500 | Represents primary synchronization (PSCH) signal power offset to use, from −35.0 to 15.0 dB in 0.1 dB steps |
| SSCH Power Offset | UINT16 | 0 . . . 500 | Represents secondary synchronization (SSCH) signal power offset to use, from −35.0 to 15.0 dB in 0.1 dB steps |
| PBCH Power Offset | UINT16 | 0 . . . 500 | Represents physical broadcast channel (PSCH) power offset to use, from −35.0 to 15.0 dB in 0.1 dB steps |
| PDSCH $P_B$ | UINT8 | 0 . . . 3 | Represents the physical downlink shared channel (PDSCH) parameter $P_B$ to use. |

Figure 1E:
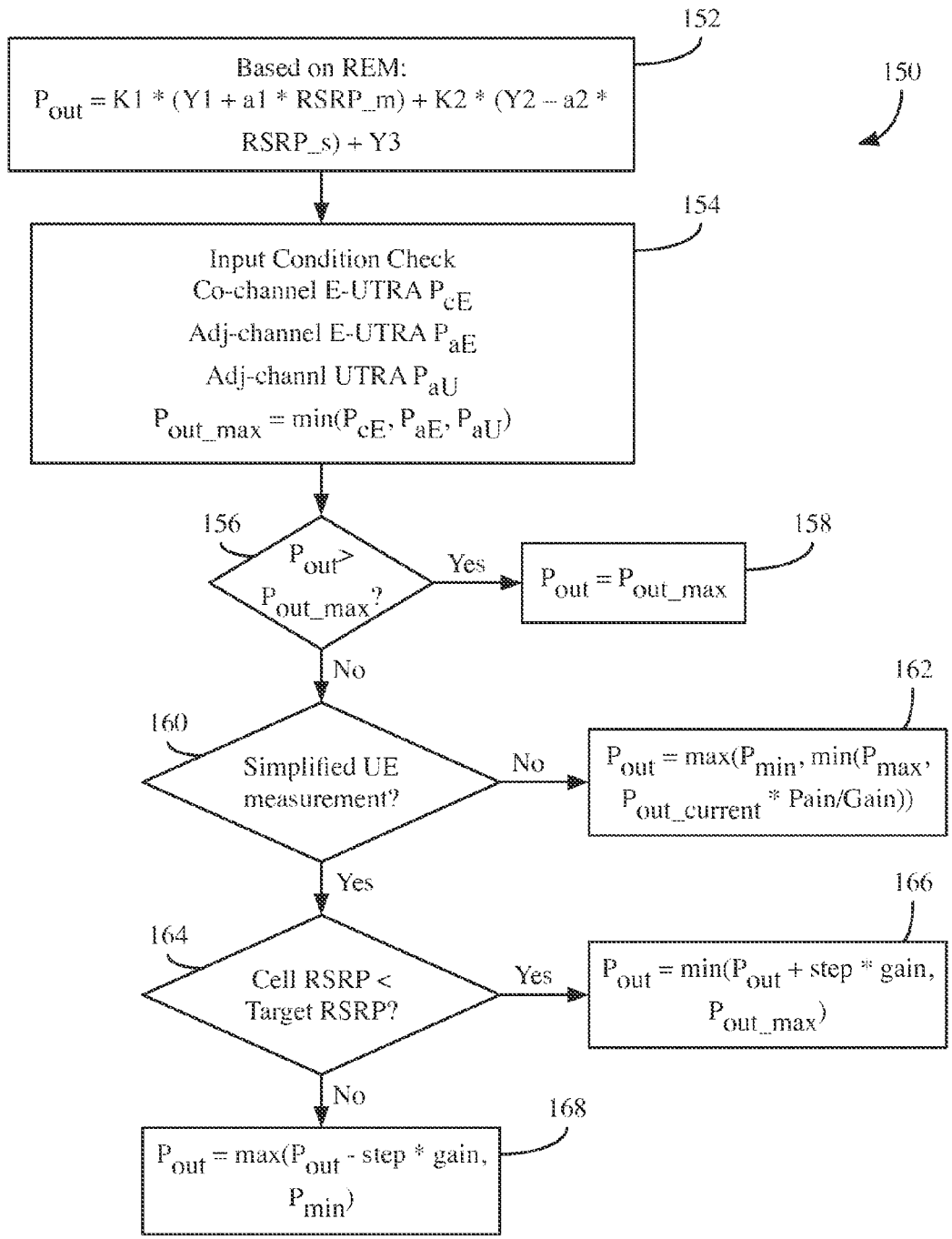
FIG. 1E is a flow diagram depicting an embodiment of a method for dynamically updating a power output of a small cell.

Referring now to FIG. 1E, a flow 150 for dynamically updating the power output of a small cell is shown, according to some embodiments. In some embodiments, flow 150 is executed periodically. In some embodiments, flow 150 is executed at randomized times, or is performed after the REM is updated, etc. In some embodiments, flow 150 is executed based on a schedule or based on a change in the networked environment. In some implementations, flow 150 is executed periodically based on a timestamp related to PCI mod 6 of the small cell. This allows for creating a REM measurement offset within neighboring cells to stabilize the process of updating the power output across many small cells in a networked environment in some embodiments.

An initial power output $P_{out}$ is calculated (152), which is described in greater detail below with respect to FIG. 1F, according to some embodiments. In some embodiments, the initial power output calculation is a weighted calculation based on the presence of macro-cells and/or small cells in the networked environment, and is based on various parameters that impact the signal quality in transmissions in the environment.

An input condition check is performed, and various metrics are sorted and compared to find a maximum value (154). In some implementations, the various metrics are retrieved from the REM. One metric $P_{cE}$ is the RSRP of a co-channel neighboring E-UTRA (evolved UMTS terrestrial radio access). This is the RSRP of a signal received from a neighboring small cell sharing the same channel as the small cell. Another metric $P_{aE}$ is the RSRP of an adjacent channel neighboring E-UTRA. This is the RSRP of a signal received from a neighboring small cell via a channel adjacent to the transmission channel of the small cell. Another metric $P_{aU}$ is the received signal power code (RSCP) of an adjacent channel neighboring UTRA. This is the power code of a signal sent on a channel adjacent to the transmission channel of the small cell. $P_{out\_max}$ is sent to the minimum of these values in some embodiments.

If the initial power $P_{out}$ is greater than $P_{out\_max}$ (156), then the new power output is set equal to $P_{out\_max}$ (158) in some embodiments. This limits the power output of the small cell to a maximum value intended to reduce interference with neighboring cells. Otherwise, it is determined whether a simplified user equipment (UE) measurement should be applied (160). In some implementations, the simplified measurement is based largely on the RSRP of the small cell in comparison with a target RSRP, and a separate optional second measurement is based on a ratio of a loss of coverage by the small cell and a gain of coverage by neighboring cells that would result from reducing the output power of the small cell.

If a simplified UE measurement is not applied, the new power output is calculated (162). A pain/gain ratio is calculated. The pain/gain ratio is representative of the tradeoffs between reducing the power output of the small cell and creating less interference for neighboring nodes. The "pain" represents the amount of signal loss that occurs when power is reduced at the small cell. The "gain" represents less interference experienced at neighboring nodes because of the reduced power. In some embodiments, this pain/gain ratio is factored into the current power output $P_{out\_current}$ of the small cell and compared to $P_{max}$. The minimum of these two values are chosen and is compared to $P_{min}$. The maximum of these two values is then chosen as the new power output.

If the simplified approach is used, a RSRP (e.g., the RSRP of a signal sent by the small cell) is compared to a target RSRP (164). A new power output is calculated based on the comparison. The target RSRP is calculated "on the fly", i.e., a new target RSRP is calculated during flow 150. For example, the target RSRP may be calibrated to equal, for instance, 95% of the strongest co-channel neighboring cell's RSRP, with a configurable margin. The configurable margin represents a value of signal loss to be expected (e.g., wall penetration loss).

If the RSRP is less than the target RSRP, the new power output is calculated as follows (166). A factor (step*gain) is calculated and added to the current power output. "step" refers to a step size of a power chance, and a factor of the step size that takes into account a possible "gain" as described above is calculated. This new value is compared to $P_{out\_max}$, and the minimum of the two values is chosen as the new power output. In this manner, the output power is stepped up to move the RSRP of the small cell closer to the target RSRP.

If the RSRP is greater than the target RSRP, the new power output is calculated as follows (168). A factor (step*gain) is calculated and subtracted from the current power output. This new value is compared to $P_{min}$, and the maximum of the two values is chosen as the new power output. In this manner, the output power is stepped down to move the RSRP of the small cell closer to the target RSRP in some embodiments.

In various embodiments, flow 150 is executed for various scenarios in which the power output of the small cell should be adjusted. For example, as a user device moves from a center of the range of the small cell to an edge of the range, the power output of the small cell should be increased. The RSRP of the signal transmitted to the UE decreases, while the RSRP of the signal transmitted by a neighboring node to the UE increases and the target RSRP becomes higher. The dynamic update of flow 150 triggers to increase the power output in order for the RSRP of the signal to "catch up" with the target RSRP in some embodiments. The cell range of the small cell becomes larger. As another example, as a user device moves from an edge of the range of the small cell to the center of the range, the opposite happens. The RSRP increases while the RSRP for a neighboring cell decreases, and the target RSRP decreases. Flow 150 is triggered to decrease the power output accordingly. The cell range of the small cell is decreased and the interference of the small cell to the entire network is smaller, all while the user experience at the user device is maintained.

As another example, if the initial output power of the small cell is too high, the RSRP of a signal sent to the user device is much higher than the target RSRP. Flow 150 is triggered to keep decreasing the power output until it is on the same level as the target RSRP. Similarly, flow 150 may keep increasing the power output until it is on the same level as the target RSRP if the initial output power is too low.

Referring again to FIG. 1C, and more particularly initial power output module 46, the calculation of the initial power output of a small cell (also called home base station or home BS) is described in greater detail according to some illustrative embodiments. Various metrics are retrieved from REM 40. One such metric is CRS Ês,co, measured in dBm, which is the RSRP present at the home base station (e.g., the small cell) received on a channel being shared with another node (macro-cell or femto-cell). Another such metric is Ês,adj, measured in dBm, which is the RSRP present at the home base station (BS) received on a channel adjacent to the transmission channel of the small cell. Another such metric is CPICH Êc, measured in dBm, which is the code power of the primary CPICH on an adjacent channel of the small cell, at the home BS. Another such metric is Ioh, measured in dBm, which is the total received downlink power present at the home BS, including all interference but excluding the own signal of the home BS. Another such metric is retrieved from a user device in the network. Iob, measured in dBm, is the uplink received interference power present at the home BS, including thermal noise, within one physical resource block's bandwidth of $N_{sc}^{RB}$ resource elements.

A path loss model is used to calculate signal loss during transmission from the home BS or small cell in some embodiments. For example, one pathloss model is: $a+20*\log_{10}(r)$ with default values of $a=38.5$, $r=10$.

A configurable target interference level is set. A radius r is defined as the target small cell radius. In some embodiments, r is selected within a pre-defined set {10, 20, 30, 40} so that 20 log 10(r) can be stored in a look-up table as {20, 26, 29.5, 32}.

An initial power setup for a power setup mode m=0 can then be calculated, to provide coverage for a radius r, by the following equation:

$$P_{out}=\max(P_{min\_ini},\min(P_{max},CRS\hat{E}s,co+ 10\log_{10}(N_{RB}^{DL}N_{sc}^{RB})+(a+20*\log_{10}(r)))).$$

For a mode m=1, the aim is to maintain the same level (configurable by a service provider or retrieved from a look-up table as a function of Ioh) of the product of the power and the strongest RSRP (which can be viewed as the sum rate):

$$P_{out}=\max(P_{min\_ini},\min(P_{max},TargetProduct- \alpha*CRS\hat{E}s,co+10\log_{10}(N_{RB}^{DL}N_{sc}^{RB})+(a+ 20*\log_{10}(r)))).$$

In some implementations, mode 0 and mode 1 are combined to take into account both scenarios:

$$P_{out}=K1*(Y1+a1*RSRP\_m)+K2*(Y2-a2*RSRP\_s)+Y3.$$

$10\log_{10}(N_{RB}^{DL}N_{sc}^{RB})$ can be stored in a look-up table since $N_{RB}^{DL}$ can only take values from {6, 15, 25, 50, 75, 100} and $N_{sc}^{RB}=12$. The look-up table could be derived as {18.5, 22.5, 25.0, 28.0, 29.5, 16.0}. LUT can be stored as UINT8 format with 1 fractional bit {37, 45, 50, 56, 59, 62}.

In the above equation, K1 and K2 are derived from the ratio of macro-cells and small cells in the networked environment. For example, if there are more macro-cells in the network, K1 is weighted more than K2, resulting in the impact of the macro-cells on the power output of the small cell being higher. Similarly, if there are more small cells in the network, K2 is weighted more than K1. The term (Y2−a2*RSRP_s) relates to the small cells. This term is used to reduce reference signal pollution and to provide a constant sum rate of the small cell and its strongest neighboring small cell in some embodiments. The terms Y1, Y2 relate to the various parameters associated with the macro-cell environment and small cell environment, respectively. Y3 factors in various parameters not related to any nodes, such as a typical wall loss and other sources of signal loss. If there are only macro-cells present, the power output is set to provide a constant coverage distance. If there are only small cells present, the power output is set to achieve a target sum rate in some embodiments.

As described above, the power output of the small cell is adjusted based on changes of various input conditions. Below illustrates potential changes in power output based on the change of a metric $P_{cE}$ as described above:

| Input Conditions | Output power, $P_{out}$ |
|---|---|
| Ioh (DL) > CRS Ês, co + $10\log_{10}(N_{RB}^{DL} N_{SC}^{RB})$ + 30 dB and Option 1: CRS Ês, co ≥ −127 dBm or Option 2: CRS Ês, co ≥ −127 dBm and Iob > −103 dBm | ≤10 dBm |
| Ioh (DL) ≤ CRS Ês, co + $10\log_{10}(N_{RB}^{DL} N_{SC}^{RB})$ + 30 dB and Option 1: CRS Ês, co ≥ −127 dBm or Option 2: CRS Ês, co ≥ −127 dBm and Iob > −103 dBm | ≤max (Pmin, min (Pmax, CRS Ês, co + $10\log_{10}(N_{RB}^{DL} N_{SC}^{RB})$ + X)) 30 dB ≤ X ≤ 70 dB Pmin = −10 dBm |

The output power $P_{out}$ is the sum of transmit power across all the antennas of the small cell, with each transmit power measured at the respective antenna connectors. $N_{RB}^{DL}$ is the number of downlink resource blocks in the own small cell channel. $N_{sc}^{RB}$ is the number of subcarriers in a resource block, for example equal to 12. X is a network configurable parameter. $P_{min}$ can be lower dependent on the small cell total dynamic range. $P_{max}$, the maximum total power output, of the small cell is the mean power level measured at the antenna connector during the transmitter on period in a specified reference condition.

The table below illustrates a potential change in power output based on the change of a metric $P_{aE}$ as described above:

| Input Conditions | Output power, $P_{out}$ |
|---|---|
| Ioh > CRS Ês, adj + $10\log_{10}(N_{RB}^{DL} N_{SC}^{RB})$ + 30 dB and CRS Ês ≥ −127 dBm | ≤10 dBm |
| Ioh ≤ CRS Ês, adj + $10\log_{10}(N_{RB}^{DL} N_{SC}^{RB})$ + 30 dB and CRS Ês, adj ≥ −127 dBm | ≤max(8 dBm, min(20 dBm, CRS Ês, adj + $10\log_{10}(N_{RB}^{DL} N_{SC}^{RB})$ + 85 dB)) |

The home BS transmitter output power specified in the above table assumes a home BS reference antenna gain of 0 dBi, and a target outage zone of 47 dB around the home BS for an UE on the adjacent channel, with an allowance of 2 dB for measurement errors, an ACIR of 30 dB, an adjacent channel UE Ês/Iot target of −6 dB and the same CRS Ês value at the adjacent channel UE as for the home BS.

The table below illustrates a potential change in power output based on the change of a metric $P_{aU}$ as described above:

| Input Conditions | Output power, $P_{out}$ |
|---|---|
| Ioh > CPICH Êc + 43 dB And CPICH Êc ≥ −105 dBm | ≤10 dBm |
| Ioh ≤ CPICH Êc + 43 dB and CPICH Êc ≥ −105 dBm | ≤max(8 dBm, min(20 dBm, CPICH Êc + 100 dB)) |

The home BS transmitter output power specified above assumes a home BS reference antenna gain of 0 dBi, and a target outage zone of 47 dB around the home BS for an UE on the adjacent channel, with an allowance of 2 dB for measurement errors, an ACIR of 33 dB, an adjacent channel UE CPICH Ec/Io target of −18 dB and the same CPICH Êc value at the adjacent channel UE as for the home BS.

With reference to the above tables, the power output of the home BS is updated based on small cell and macro-cell metrics. In some embodiments, the power output is calculated based on user device or UE measurements. By basing the transmit power on the measurement results from the UE's report scheme, subsequent measurement results are closer to a predetermined or network notified target value. If multiple UEs connect to the home BS, the minimum value of the measurement results reported by each UE should be close to the target value. The measurement result may be measurement statistics such as x-percentile values.

One example process of using UE measurements to determine a power output is as follows. A RSRP is retrieved from a UE report, and other parameters are retrieved such as the target RSRP and the step size of a power change. A UE RSRP distribution is derived using the RSRP from the UE. An x % low value is extracted and compared with the target RSRP. If the value is smaller than the target RSRP, the power output is increased by a step size of the power change. Otherwise, the power output is decreased by a step size of the power change. The UE measurements are triggered, for example, by active noise reduction (ANR).

In one embodiment, a pain/gain strategy as described above maybe implemented:

$$P_{out\_update} = \max\left(P_{min}, \min\left(P_{max}, P_{out\_current} * \frac{\sum_i Pain_i}{\sum_j Gain_j}\right)\right).$$

Pain and gain are quantized into several levels according to SINR and RSRP difference, respectively. In some embodiments, pain is derived from the UE measurement report and is based on the potential signal strength when the power output of the home BS is reduced. In some embodiments, gain is determined by calculating the RSRP difference from a measurement report of a UE on the edge of the range of the small cell, and is based on the potential signal strength from other small cells when the power output of the home BS is reduced.

Figure 1F:
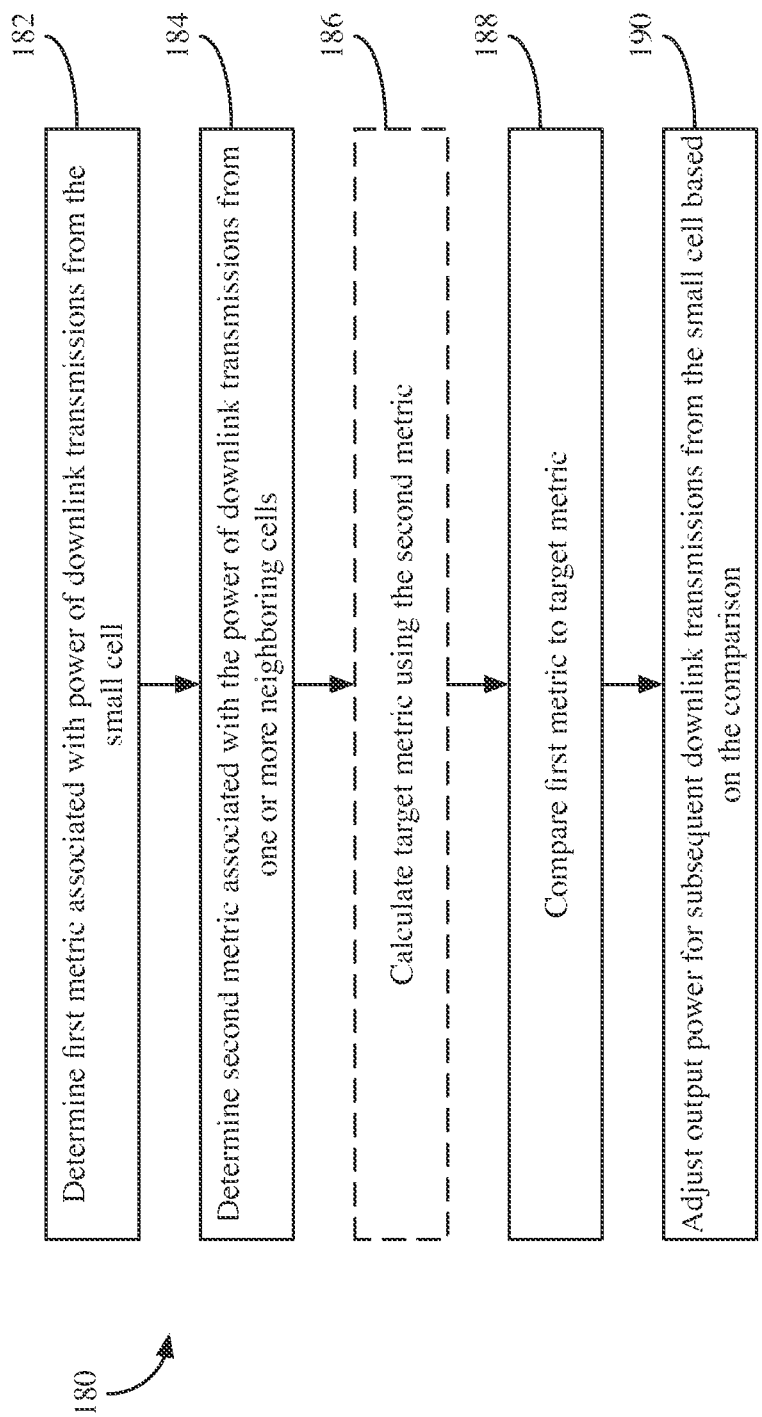
FIG. 1F is another flow diagram depicting an embodiment of a method for adjusting an output power of a small cell.

Referring now to FIG. 1F, a flow 180 for adjusting an output power of a small cell is shown, according to some embodiments. Flow 180 may be executed by, for example, small cell 104 for adjusting a power output of the small cell.

Flow 180 includes determining a first metric associated with a power of downlink transmissions from the small cell (182). For example, the first metric is associated with downlink transmissions received at a user device in a networked environment covered by the small cells and other cells. Flow 180 further includes determining a second metric associated with the power of downlink transmissions from one or more neighboring cells (184). For example, the second metric is associated with downlink transmissions from neighboring small cells to the small cell.

Flow 180 includes calculating a target metric using the second metric (186) and comparing the first metric to the target metric (188). For example, the target metric is used to determine if the small cell is at an appropriate power output level. The target metric is representative of other downlink transmissions in the network. By comparing the first metric to the target metric, flow 180 determines if the power output from the small cell impacts the other transmissions.

Flow 180 includes adjusting an output power for subsequent downlink transmissions from the small cell based on the comparison (410). For example, the output power is increased if the first metric is lower than the target metric, and the output power is decreased if the first metric is greater than the target metric.

Figure 2A:
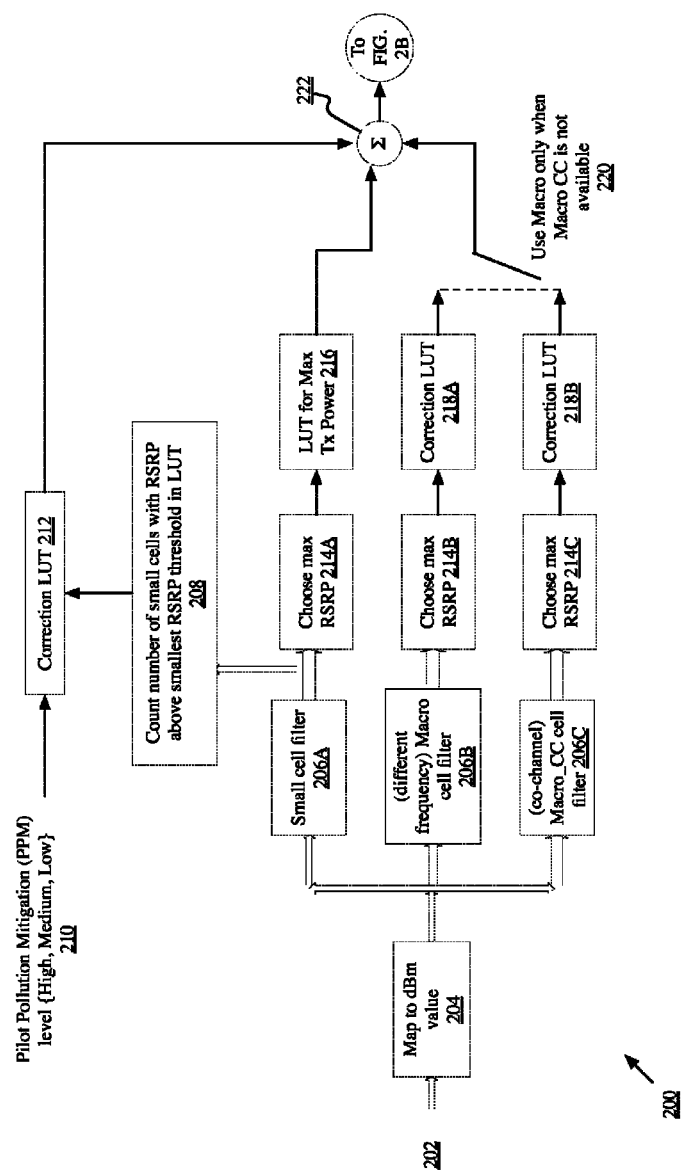
FIGS. 2A and 2B are flow diagrams of an implementation of a method for determining a maximum reference signal power output based on a radio environment map (REM)
Figure 2B:
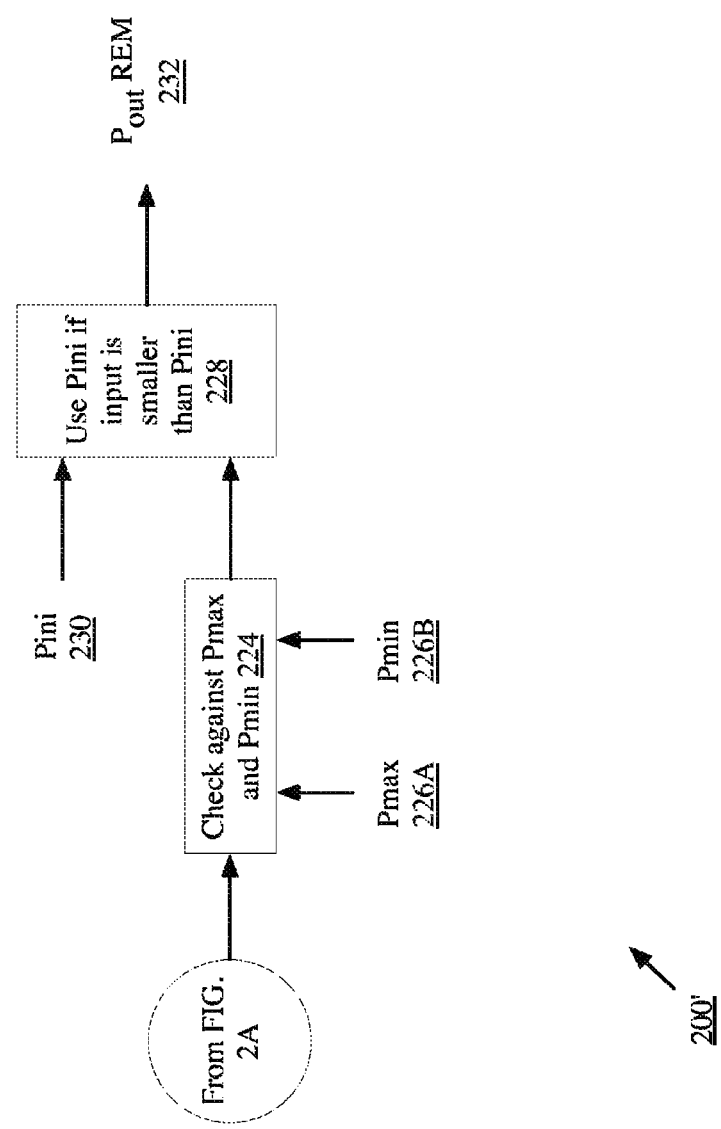

FIGS. 2A and 2B are flow diagrams of an implementation of a method 200 for determining a maximum reference signal power output based on a radio environment map (REM). The maximum transmission power is set based on the small cell maximum RSRP using look up tables and baseline algorithms discussed below. Correction is applied based on partner macro cells' RSRP, and further correction is applied based on pilot pollution mitigation level, and the number of neighbor cells detected. Specifically, based on the RSRP from neighboring cells, a maximum RSRP may be identified as corresponding to a neighboring cell. Such a cell will have dominant interference due to its higher transmit power or its location close to the target or subject cell.

Referring first to FIG. 2A, at step 204, an input RSRP from parameter set 100, in an unsigned 8-bit representation, is mapped to a dBm value as discussed above. The output, as a 16-bit signed value, is provided to filters 206A-206C, which only pass entries according to the corresponding cell type flag discussed above in parameter set 100 (e.g. small, macro, macro_cc). Cell-specific reference signal power (RS Tx Power) may be used to verify whether the cell is macro or small. Depending on filter output, the corresponding max RSRP is selected at steps 214A-214C. At step 216, if the cell type is small, then maximum transmission power is determined using a lookup table:

| RSRP (dBm) | Max Tx Power (dBm) |
|---|---|
| −60 | −7 |
| −70 | 13 |
| −80 | 20 |
|  | 20 |

The table values are provided as examples, and may be set by a Home eNodeB management system (HeMS) to any desired values. Using the above-provided values, in one implementation, if RSRP is over −60 dBm, then maximum Tx power is set to −7 dBm; else, if RSRP is over −70 dBm, then maximum Tx power is set to 13 dBm; else, if RSRP is over −80 dBm or below, then maximum Tx power is set to 20 dBm. Maximum Tx power may be provided as an 8-bit signed value in dB.

If the cell type is small, additionally, at step 208, the number of small cells with RSRP values above the smallest RSRP threshold in the above lookup table (e.g. −80 dBm) may be counted. At step 212, the resulting number of cells and a predetermined pilot pollution mitigation (PPM) level (e.g. high, medium, or low) 210 may be used to determine a correction value, provided as an 8-bit signed value in dB, using a second lookup table:

| Small cell number | Correction (dB) | | |
|---|---|---|---|
|  | PPM Low | PPM Medium | PPM High |
| ≤1 | 20 | 15 | 10 |
| 2 | 15 | 10 | 0 |
| ≥3 | 5 | 0 | −10 |

The table values are provided as examples, and may be set to any desired values.

At step 218A, if the cell type is macro, and not on a co-channel, then a correction factor is applied using a third lookup table:

| Macro cell RSRP (dBm) | Correction (dB) |
|---|---|
| −50 | 20 |
| −80 | 10 |
| −110 | 5 |
|  | 0 |

The table values are provided as examples, and may be set to any desired values. In one implementation, if RSRP is over −50 dBm, then a correction of 20 dB is applied; else, if RSRP is over −80 dBm, then a correction of 10 dB is applied; else, if RSRP is over −110 dBm, then a correction of 5 dB is applied; otherwise, no correction (0 dB) is applied.

Likewise, at step 218B if the cell type is macro_cc (on a co-channel), then a correction factor is applied using a fourth lookup table:

| Macro cell RSRP (dBm) | Correction (dB) |
|---|---|
| −50 | 30 |
| −80 | 20 |
| −110 | 5 |
|  | 0 |

The table values are provided as examples, and may be set to any desired values. As shown, at step 220, if macro_cc is not available, then the macro correction value may be used. Correction values may be provided as an 8-bit signed value in dB.

The above determined maximum transmission power and corrections are summed at step 222. Turning to FIG. 2B briefly, the output transmission power $P_{out}$ is compared at step 224 to predetermined maximum power $P_{max}$ 226A and minimum power 226B $P_{min}$ values, and correspondingly reduced or increased to $P_{max}$ or $P_{min}$ if $P_{out}$ exceeds these boundaries. At step 228, $P_{out}$ is compared to an initial power level $P_{ini}$ 230, and if $P_{out}$ is less than $P_{ini}$, increased to equal $P_{ini}$. The resulting value $P_{out}$ 232 thus represents the maximum output power dynamically determined based on REM measurements.

Figure 3:
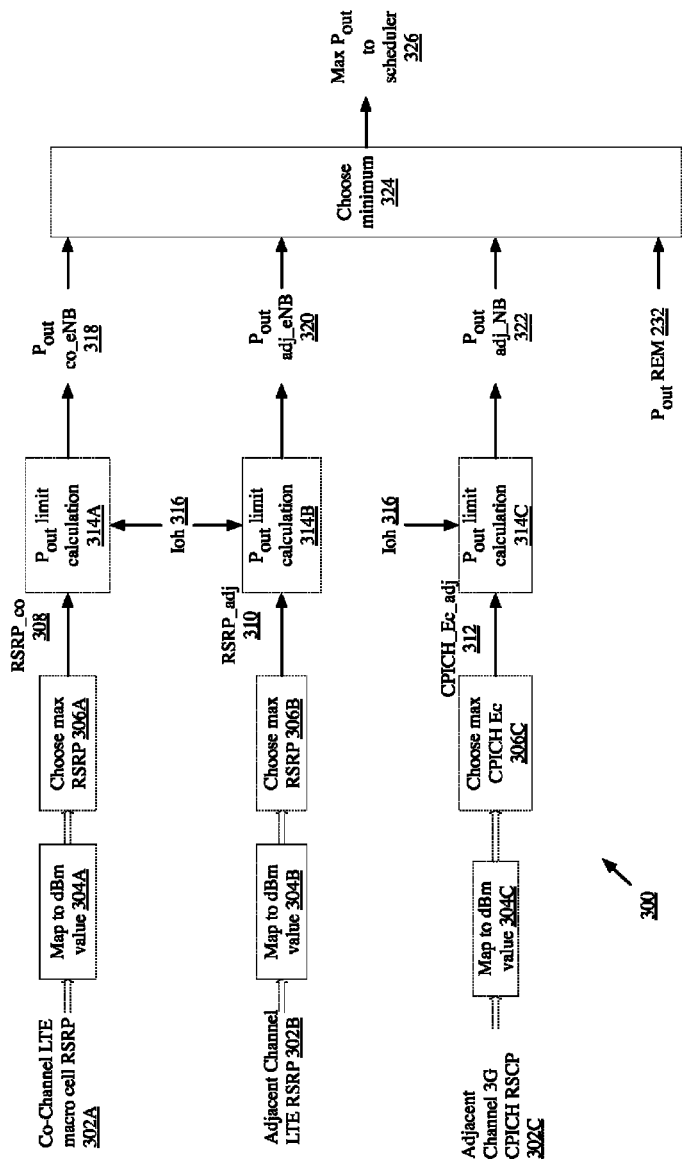
FIG. 3 is a flow diagram of an implementation of a method for determining a maximum reference signal power output based on network configuration and conditions.

FIG. 3 is a flow diagram of an implementation of a method 300 for determining a maximum reference signal power output based on network configuration and conditions. The output of method 200, $P_{out}$ REM 232 is provided as an input to selector 324. Other inputs are determined based on RSRP of adjacent 3G and LTE channels, and co-channel LTE macro cells, which may received via X2 or any similar communication protocol. Specifically, at step 304A, one or more co-channel LTE macro cell RSRPs 302A are mapped to dBm values, according to the parameter set mapping discussed above. The maximum RSRP is selected at step 306A, defined as RSRP_co 308. Given an input Ioh 316, at step 314A, a $P_{out}$ limit calculation is performed, wherein:

```
P_out ≤ P_max;
if CSG_indication or Non_CSG_P_out_Check
    if RSRP_co ≥ −127 and Iob ≥ −103
        if Ioh > RSRP_co + 30 + K, then
            P_out ≤ 10 dBm;
```

```
        else
            P_out ≤ max(P_min, min(P_max, RSRP_co +
                K + Powersetting offset))
        end if
    end if
end if
```

Normalization value K is determined from a predefined lookup table:

| Bandwidth in RBs (MHz) | Normalization amount K (dB) |
|---|---|
| 6 (1.4) | 19 |
| 15 (3) | 23 |
| 25 (5) | 25 |
| 50 (10) | 28 |
| 75 (15) | 30 |
| 100 (20) | 31 |

The table values are provided as examples, and may De set to any desired values. The resulting $P_{out}$ from the above calculation is provided as input $P_{out\_co\_eNB}$ 318 to selector 324.

Similarly, at step 304B, one or more adjacent LTE channel cell RSRPs 302B are mapped to dBm values, according to the parameter set mapping discussed above. The maximum RSRP is selected at step 306B, defined as RSRP_adj 310. Given an input Ioh 316, at step 314B, a second $P_{out}$ limit calculation is performed, wherein:

```
P_out ≤ P_max;
if RSRP_adj ≥ −127
    if Ioh > RSRP_adj + 30 + K, then
        P_out ≤ 10 dBm;
    else
        P_out ≤ max(8 dBm, min(20 dBm, RSRP_adj+ K + 85))
    end if
end if
```

Normalization value K is similarly determined from the above predefined lookup table. The resulting $P_{out}$ from the above calculation is provided as input $P_{out\_adj\_eNB}$ 320 to selector 324.

Likewise, at step 304C, one or more adjacent 3G cell CPICH RSCP values 302C are mapped to dBm values, according to the parameter set mapping discussed above. The maximum CPICH energy per chip (Ec) is selected at step 306C, defined as EPICH_Ec_adj 312. Given an input Ioh 316, at step 314C, a third $P_{out}$ limit calculation is performed, wherein:

```
P_out ≤ P_max;
if CPICH_Ec_adj ≥ −105
    if Ioh > CPICH_Ec_adj + 43, then
        P_out ≤ 10 dBm;
    else
        P_out ≤ max(8 dBm, min(20 dBm, CPICH_Ec_adj +100))
    end if
end if
```

The resulting $P_{out}$ from the above calculation is provided as input $P_{out\_adj\_NB}$ 322 to selector 324.

At step 324, the selector sets $P_{out}$ to the minimum of $P_{out\_co\_eNB}$ 318, $P_{out\_adj\_eNB}$ 320, $P_{out\_adj\_NB}$ 322, and $P_{out}$ REM 232, and at step 326, provides the determined $P_{out}$ to the scheduler as the downlink power setting.

Additional parameters may also be dynamically determined. Power offset values for PSCH, SSCH, and PBCH may be defined according to the TR-196 standard. In many implementations, PSCH and SSCH offsets may be 0 dB. PBCH offsets may typically be 0 dB for a signal antenna port, and −3 dB for Tx diversity modes. PDSCH $P_B$ values may also be selected according to TR-196 (e.g. 0 for a single antenna, 1 for multiple antennas, and may be higher values for boosting RS reference power for greater coverage).

Reference signal transmission power may be derived from the dynamically determined $P_{out}$ as:

$$RSTxPower\ (dBm) = P_{out}(dBm) - 10\log\downarrow 10\uparrow(12*Bandwidth\ in\ RBs*Number\ of\ antenna\ ports) + 10\log\downarrow 10\uparrow(1*PSDCH P_B).$$

The result may be range limited to −60 to 50 dBm and quantized to the nearest available value received from HeMS, and converted into an unsigned 8-bit integer for storage.

In some implementations, additional information may be available from the HeNB, including: UE uplink quality estimates; Backhaul capacity; HeNB hardware processing capability; and global navigation satellite system (GNSS) detection performance, if available, together with macro cell detection. Similarly, additional information may be available from UE including: RSRP and reference signal received quality (RSRQ) report of HeNB and neighbor cells; channel state information (CSI) report (channel quality information (CQI), Rank, etc.); and GNSS or timing report (Location info). In some implementations, steps may be taken to ensure minimum HeNB RSRP/RSRQ targets for a predefined number of UEs (up to the maximum the HeNB can handle), at a given max neighbor cell RSRP measured by the UEs. In many implementations, Tx power may not be increased further if the HeNB is approaching a hardware processing limit. Backhaul may impose limits on the maximum capacity for HeNB. In some implementations, Tx power may not be increased further if the backhaul is approaching capacity limit. UE RSRP and RSRQ reports, CSI reports and UL quality reports may be used to assess coverage and capacity trade-offs, as well as UL/DL imbalance. For HeNB GNSS, poor detection may indicate a shielded condition from outside. This can be further verified by macro cell path loss estimation. On the other hand, good GNSS detection but no macro cell detection may indicate an isolated deployment. Tx can be set at high to max level in such instances. UE GNSS and timing report can be used to improve estimates of the coverage range.

Additionally, in some implementations, other cells may provide REM results and GNSS reports. Similarly, other UE may provide measurement reports (RSRP, RSSI); CSI reports (CQI, rank, etc.); GNSS or timing reports or other location information. This data may be received via X2 protocols or other interfaces. The information may be used to identify radio propagation conditions and cellular premise boundaries. Power setting impacts on cell edge users may be quantified for monitoring purpose, and may be based on total throughput for the cell edge users on multiple cells (e.g. self and neighbor). The system may accordingly ensure minimum differential RSRP/RSRQ targets between the HeNB and the reporting cell, measured at the UEs being reported, where the UE's link quality is "poor" (as determined by CSI values below a predetermined threshold). The target may be adjustable to control inside or outside coverage.

In some implementations, downlink transmit power management may be applied for network capacity optimization and interference management. However, because transmit capability is a function not just of transmit power but noise levels, in the form of interference from other nearby cells, instantaneously updating the transmit power for a cell to a desired target power may lead to unbalanced power settings within the network. For example, increasing transmit power in one device causes neighboring devices to receive more noise, leading them to increase transmit power, causing the initial device to receive more noise. Without more intelligent management, the devices all quickly reach maximum power levels, without proper balancing.

In another example, an initial target power setting may be determined for a device by one of a remote energy management technique, a local network energy management technique, or a device energy management technique. For example, when a first device initially powers up or begins transmitting, the device may determine an ambient transmission power level of neighboring devices, such as the RSRP within a transmission channel frequency bandwidth. In one implementation, if the device is the first device to begin transmitting, the RSRP may be minimal. Therefore, as there is not a channel present for which transmission can cause interference, the transmit power of the device may be set to the target power setting, and the device may transmit at the target power setting. In some implementations, the target power setting of the first device may be a highest possible level, to provide the broadest possible coverage in the absence of interference from neighboring devices.

When a second device subsequently powers up, the second device may determine the RSRP of neighboring devices (such as due to the RSRP of the first device), and the second device may adjust its target power setting and its transmit power to minimize interference with the first device. If the first device is transmitting at a maximum power level, as discussed above, then the second device may detect the RSRP of the first device at a high level, and adjust its own target transmit power to a lowest power level to avoid interfering with the other device.

Subsequently, the first device and second device may perform a periodic power configuration check. The first device may determine that the second device has the highest RSRP of neighboring devices, but has a relatively low level of interference (because the second device is transmitting at a lowest power level). Accordingly, the first device may continue transmitting at its highest power level. Conversely, the second device may determine that the first device has a highest RSRP, at a high level, and may retain its lowest possible level to avoid interfering. Accordingly, the two devices can provide significantly different cell coverage, even if they are substantially identical in configuration, merely due to which is powered first.

Accordingly, in some implementations, a target transmit power may be determined based on a REM, or neighboring cell's RSRP (such as the strongest RSRP, indicating the closest neighboring cell). The transmit power may be updated iteratively in steps towards the target power, with monitoring of changes to the network environment. In some implementations, the power management may be modeled as or represented by a finite state machine, with each predetermined transmit power level corresponding to a state. At a configured time of transmit power configuration, the target power may be obtained using any of the methods discussed above. If the target power is greater than the current power level, then the device may increase its transmit power to a next level of higher transmit power levels; if the target power is less than the current power level, then the device may decrease its transmit power to a next level of lower transmit power levels.

For example, given the same first and second devices discussed above, each may have a predetermined target setting of a highest possible transmit power. When the first device powers up while the second device is offline, the first device determines that there is minimal or no RSRP from neighboring devices, and so retains a target power setting of the highest possible transmit power. However, because the last power setting for the first device was zero (e.g. when offline), instead of jumping immediately to the target power setting level as described in the foregoing example, the first device may begin transmitting at a lowest possible power level. Subsequently, the second device may power up and determine that the highest RSRP is from the first device. Because the RSRP from the first device is low due to broadcasting at the lowest possible power level setting of the first device, the second device may retain its target power setting of the highest power level but similarly begin transmitting at the lowest possible level.

In a subsequent power configuration check, the first device may measure the RSRP from the second device, and determine that its own target power setting should be retained at the highest possible power level (again due to the low received interference from the second device). The first device may again increase its transmit power one level to a second lowest power level or next intermediary power level. Similarly, in a subsequent power configuration check, the second device may measure the RSRP from the first device. However, due to the increased signal from the first device, the second device may determine that its own target power setting should be reduced to a second-highest power level. As this is still higher than a present power level, the second device may increase its transmit power one level to a second lowest power level. The process may repeat iteratively, until the two devices have increased present transmission power and decreased target transmission power until converging at a proper, balanced middle level.

In one such implementation, given configured power Pc; target power Pt; predefined offset or adjustment ΔP:

$Pc=\min(Pc+\Delta P, Pt)$, if $Pc<Pt$;

$\max(Pc-\Delta P, Pt)$ if $Pc>Pt$; or $Pc$, if $Pc=Pt$.

Configured and target powers and offsets or adjustments may be defined in terms of predetermined power levels, as in a lookup table, or may be dynamically set based on decibels, Watts, or other units.

Figure 4A:
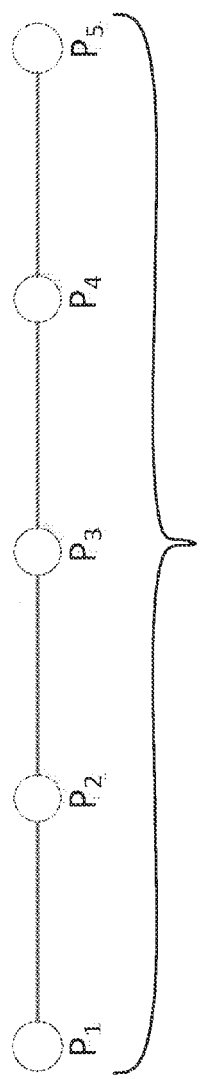
FIGS. 4A-4D are diagrams showing power level transitions among predetermined states for downlink transmit power management in a small cell, according to one implementation.

FIGS. 4A-4D are diagrams showing power level transitions among predetermined states for downlink transmit power management in a small cell, according to one implementation. Referring first to FIG. 4A, illustrated is a set of five predetermined power levels 400, $P_1$-$P_5$, with $P_1<P_2<P_3<P_4<P_5$. In some implementations, these power levels may be stored in a look-up table and/or determined by an algorithm for determining target power settings, such as any of the methods discussed above. The power determination may be performed on start up or beginning of transmission after a reset, and/or may be performed periodically (e.g. once per minute, once per ten minutes, once per hour, etc.) or upon detection of changes to the network (e.g. when nodes enter or leave the network, when a node within the network is physically repositioned, when a node battery is at a low charge level, or when a node goes through a reset). Some such disturbances may be detected via changes in measured transmission power (e.g., changes in measured RSRP) and/or by information received through the network from other nodes in the network.

Figure 4B:
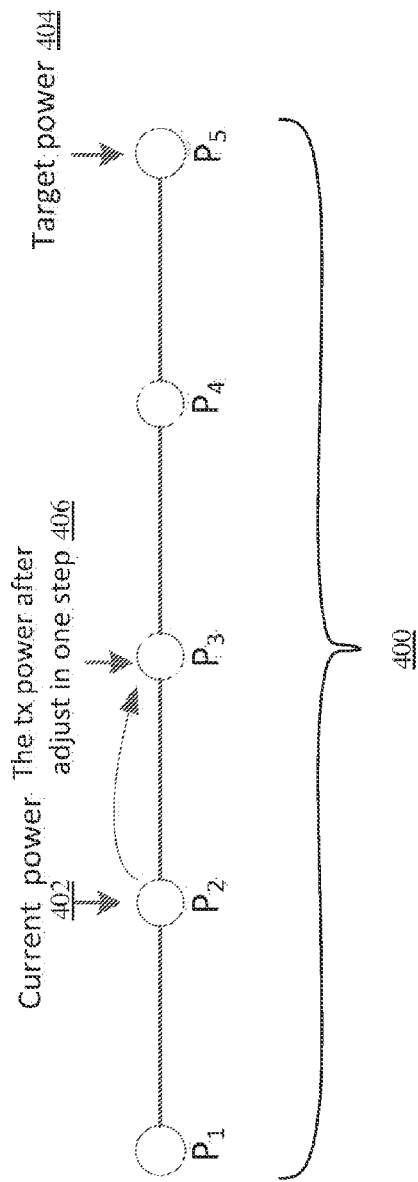
Figure 4C:
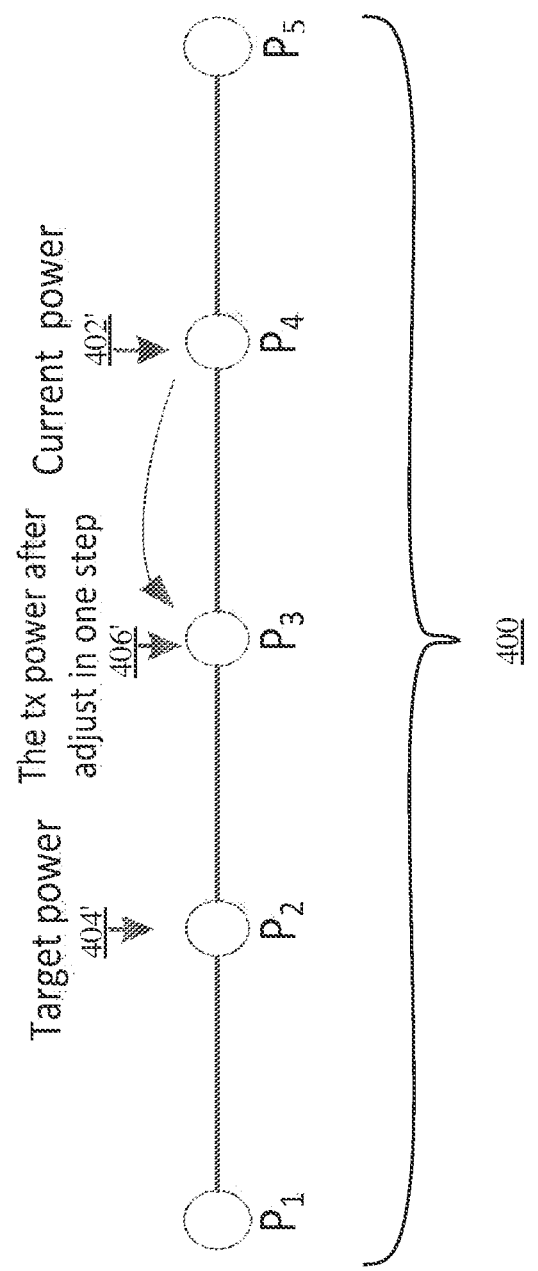

Referring to FIG. 4B, as discussed above, a device may be at a first power level 402, and have a target power level 404. The device may determine that a present power 402 is less than a target power 404, and may increase the transmission power by one step to a next power level 406. Referring to FIG. 4C, a device may be at a fourth power level 402', and may have a target power level 404'. The device may determine that the current power 402' is greater than a target power 404', and may decrease the transmission power by one step to a next power level 406'.

Figure 4D:
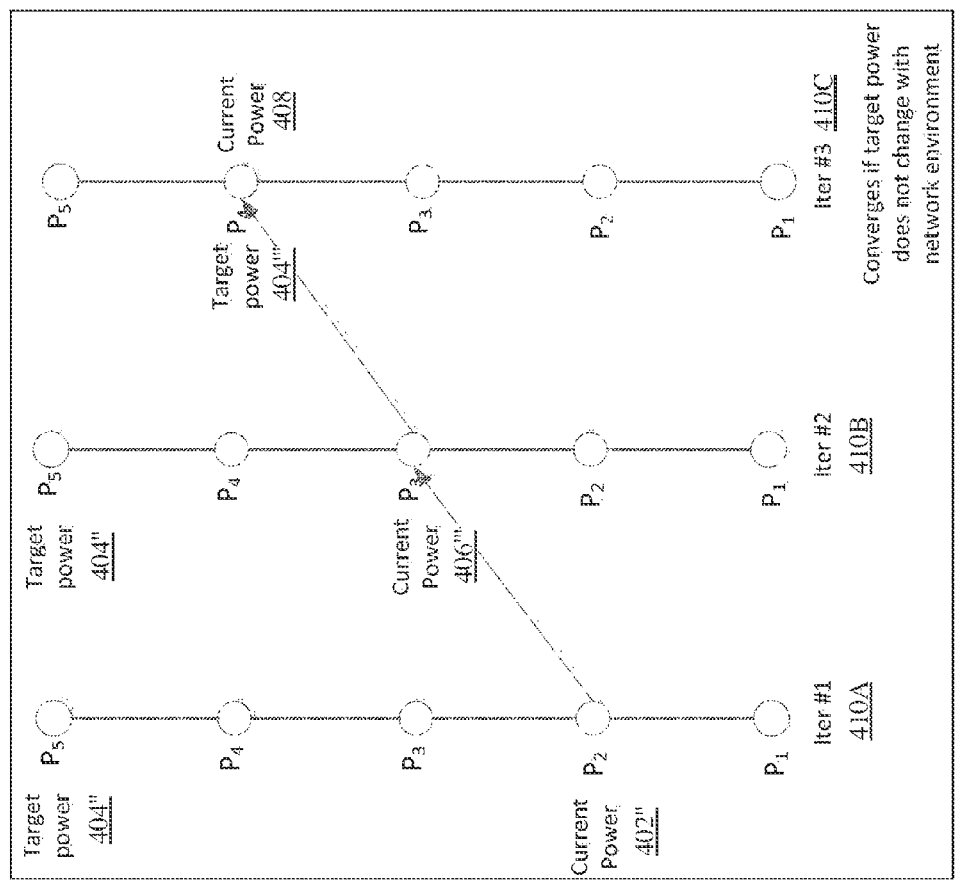

FIG. 4D illustrates this process in terms of iterations 410A-410C. Given an initial target power 404" of $P_5$ and a current power 402" of $P_2$, the device may determine to increase its transmission power to 406''' $P_3$. Subsequently, during iteration 2 410B, the device may similarly determine that its current power 406''' is less than a target power 404" and may increase its transmission power. Finally, during iteration 3 410C, the device may reduce its target power to 404'''$P_4$, responsive to increased RSRP from a neighboring cell, for example. The device may again determine that its current power is less than the target power, and may increase its transmission power to $P_4$ 408. In subsequent iterations (not illustrated), the target power equals the current power, so no adjustments are made until other changes occur in the network.

Figure 4E:
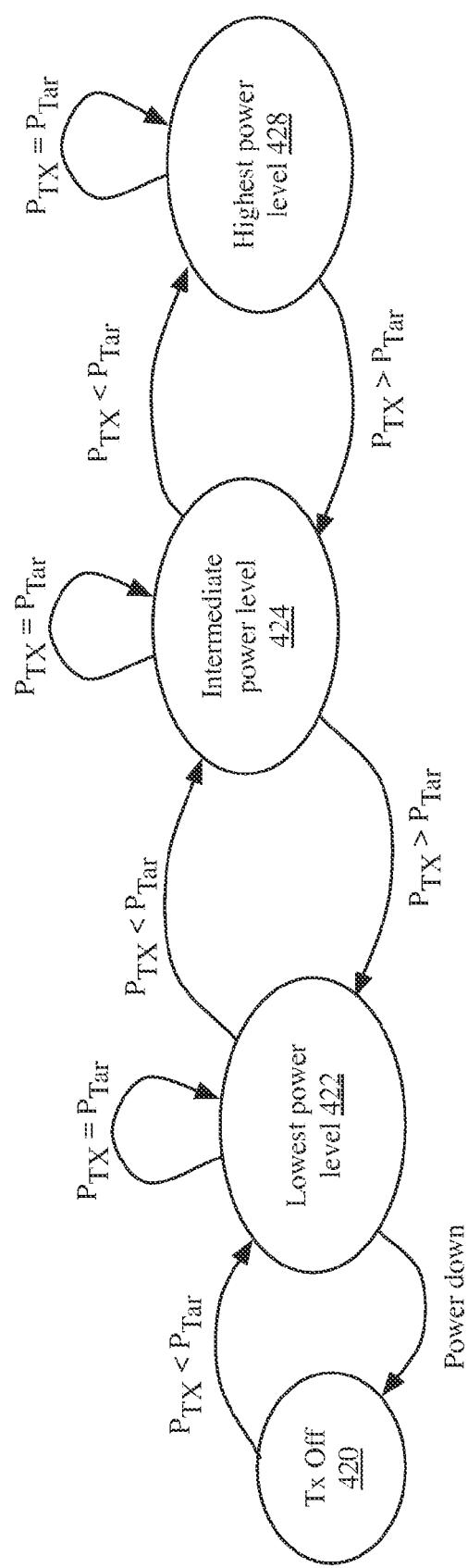
FIG. 4E is a diagram of a finite state machine for an implementation of downlink transmit power management for a small cell.

FIG. 4E illustrates an implementation of a finite state machine for adjusting power levels. From an initial or starting "off" state 420, the transmission power may be iteratively increased responsive to the transmission power $P_{TX}$ being less than a target power $P_{Tar}$, determined via any of the methods discussed above. The transmission power may be increased through lowest power level 422, through one (or more) intermediate power level(s) 424, to a highest power level 428. Conversely, if the target power $P_{Tar}$ is reduced for any reason (e.g. higher detected RSRP from neighboring cells), the transmission power may be iteratively reduced in steps through the power levels 424, 422.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for transmit power management, comprising:
receiving, by a first device transmitting on a first channel from each of a first one or more other devices, a reference signal received power (RSRP) measurement and a cell type identifier;
determining a first output power level, by the first device, based on the received RSRP measurements corresponding to each value of the cell type identifier;
receiving, by the first device from each of a second one or more other devices transmitting on channels adjacent to the first channel, a RSRP measurement;
determining a second output power level, by the first device, based on a maximum received RSRP measurement of devices transmitting on adjacent channels; and
selecting, by the first device, a maximum transmission output power from a minimum of the first and second determined output power levels.

2. The method of claim 1, wherein the cell type identifier received from each of the first one or more other devices identifies the corresponding other device as being a small cell, a macro cell on a different channel, or a co-channel macro cell.

3. The method of claim 1, wherein determining the first output power level comprises identifying a highest RSRP measurement for each cell type identifier from the received measurements.

4. The method of claim 3, wherein determining the first output power level comprises retrieving, from one of a plurality of lookup tables corresponding to each of a plurality of values of the cell type identifier, a transmitter power level associated with the identified highest RSRP.

5. The method of claim 4, further comprising applying a correction factor to the transmitter power level based on a number of received cell type identifiers corresponding to a small cell.

6. The method of claim 1, wherein determining the second output power level further comprises applying a normalization factor based on a downlink channel bandwidth of one of the first device or the second one or more other devices.

7. A device for transmission power management, comprising:
a transmitter transmitting on a first channel
a receiver configured to:
receive, from each of a first one or more other devices, a reference signal received power (RSRP) measurement and a cell type identifier, and
receive, from each of a second one or more other devices transmitting on channels adjacent to the first channel, a RSRP measurement; and
a processor configured to:
determine a first output power level, based on the received RSRP measurements corresponding to each value of the cell type identifier,
determine a second output power level, based on a maximum received RSRP measurement of devices transmitting on adjacent channels, and
select a maximum transmission output power from a minimum of the first and second determined output power levels.

8. The device of claim 7, wherein the cell type identifier received from each of the first one or more other devices identifies the corresponding other device as being a small cell, a macro cell on a different channel, or a co-channel macro cell.

9. The device of claim 7, wherein the processor is further configured to determine the first output power level by identifying a highest RSRP measurement for each cell type identifier from the received measurements.

10. The device of claim 9, wherein the processor is further configured to determine the first output power level by retrieving, from one of a plurality of lookup tables corresponding to each of a plurality of values of the cell type identifier, a transmitter power level associated with the identified highest RSRP.

11. The device of claim 10, wherein the processor is further configured to apply a correction factor to the transmitter power level based on a number of received cell type identifiers corresponding to a small cell.

12. The device of claim 7, wherein the processor is further configured to determine the second output power level by applying a normalization factor based on a downlink channel bandwidth of one of the first device or the second one or more other devices.

* * * * *